United States Patent [19]
Bigbie et al.
[11] 3,833,884
[45] Sept. 3, 1974

[54] BADGE OR CREDIT CARD READING SYSTEM WITH INTEGRAL STATUS MONITORING

[75] Inventors: Samuel E. Bigbie, Boynton Beach; Roger C. Hull, Boca Raton, both of Fla.
[73] Assignee: International Business Machines Corporation, Armonk, N.Y.

[22] Filed: June 25, 1973
[21] Appl. No.: 373,591

[52] U.S. Cl. ..... 340/147 LP, 340/147 R, 340/149 A
[51] Int. Cl. ..... H04q 5/00
[58] Field of Search ..... 340/147 LP, 149 A

[56] References Cited
UNITED STATES PATENTS
3,543,242 1/1971 Adams ..... 340/147 LP

*Primary Examiner*—Harold I. Pitts
*Attorney, Agent, or Firm*—Earl C. Hancock; Carl W. Laumann, Jr.; J. Jancin, Jr.

[57] ABSTRACT

A high priority source of discrete data records shares a common transmission line with a source of low priority random data. Logic circuitry maintains a normal connection between the low priority data source and the communication line until receipt of an indication that the higher priority data record is about to appear. The logic circuitry disconnects the low priority data source, connects the higher priority source to the common line and allows the high priority connection to be maintained until either an end of record signal is received or a period of time has passed of sufficient length so that the maximum data record must have been transmitted.

6 Claims, 4 Drawing Figures

BADGE OR CREDIT CARD READING SYSTEM WITH INTEGRAL STATUS MONITORING

BACKGROUND OF THE INVENTION

1. Field of the Invention

This invention relates to a system for multiplexing a plurality of data sources into a common data transmission path. More particularly, the present invention is concerned with circuitry for coupling digital data from multiple sources into a common data transmission path for transfer to a receiving data process equipment. The present invention is particularly useful for switching a single transmission path for introducing data read from a source of discrete data record blocks such as a badge reader while permitting the use of the transmission line for lower priority condition detection signals whenever record blocks need not be transmitted.

2. Description of the Prior Art

A continuing problem for the data processing industry is how to transfer digital data from a plurality of sources over a common transmission line into a receiving unit such as a central processing unit (CPU) in a computer system. Many systems have been developed to ensure that each of the data sources has access to the transmission line as needed in a manner which will not result in loss of data. For instance, U.S. Pat. No. 3,353,162, "Communication Line Priority Servicing Apparatus," by O'Connor et al which is assigned to the same assignee as this application used a recirculating delay line control system for multiplexing a plurality of data sources into a common communication channel so as to force higher priority for devices which are likely to become overun. A further improvement in handling multiple priority levels for such multiplexing devices is shown in U.S. Pat. No. 3,543,242, "Multiple Level Priority System," by Adams et al which is also assigned to the same assignee as this application. Such prior art devices were satisfactory for the various intended uses but involved relatively complex control circuitry.

One effort to provide a lower cost multiplexing arrangement is shown in the October 1970 IBM TECHNICAL DISCLOSURE BULLETIN (Vol. 13 No. 5) in the article entitled, "Buffer System for Multiplexing A Keyboard and A Second Unit," by Joyce. In the Joyce system, a given I/O device shown as a keyboard is normally permitted to be connected to a common communication channel. Whenever an additional I/O device is ready to transmit data, logic circuitry switches the keyboard in a local buffer and provides direct access between the additional I/O device and the communication channel.

As applications of data processing equipment such as sensor based data acquisition and control systems has expanded, a need for low-cost time-sharing a common transmission paths from a wide variety of distributed points has developed. For instance, central processing units are being applied for controlling widely distributed but relatively unsophisticated devices such as badge and credit card readers in secure controlled access environments and the like. It is necessary to transmit data from more than one source at each of these distributed locations including the data read from the badge and other randomly occurring data. The data read from the badge is critical in that it generally must be sensed in its entirety whereas the associated random data can frequently be assigned a considerably lower priority. The controlling of access through doorways and the like often requires a badge reader at the doorway and some considerably less sophiticated sensing apparatus such as a door open/close detectors and the like. The central data processing equipment can detect and separate the different types of data in correlation with its source. The cost of providing separate communication lines for each of the data sources is often prohibited as is the cost of the inclusion of controlling circuitry such as has been suggested by prior art devices including the aforementioned Joyce article.

SUMMARY OF THE INVENTION

The invention permits the sharing of a common communication line between different sources of digital data with low cost controlling logic circuitry. The system is particularly useful wherein a block of data will be occassionally transmitted such as the data read from a badge with a known time span for such blocks. The blocks are to be transmitted with highest priority as compared to other randomly occurring conditions that can be detected and are to share the common transmission line. The logic circuitry responds to a signal indicating that a block is about to be transferred by switching the condition sensing out of the common line for a length of time at least sufficiently long enough to accommodate the longest anticipated block.

Thus, the present invention is concerned with a system employing logic circuitry for low cost multiplexing of multiple events onto a common transmission line. As will be described for the preferred embodiment, the present invention is particularly useful for permitting a badge reader which might be used in a controlled access system to have an effective preempting capability for providing transmission on to the common communication line while allowing ancillary event sources to have access to that line at all times that the badge reader does not require such access. The logic includes circuitry which is initiated by a signal indicating that the priority data transfer is about to occur, this being potentially providable in one embodiment by a microswitch at the badge reader. The logic circuitry terminates access to the line for the higher priority transmission such as the badge reading sequence by either a time-out function which is sufficiently long to allow for the longest anticipated transmission time for a record block or else by a end of message type signal such as might be produced by an additional microswitch in the badge reader which indicates the end of the badge reading sequence. AND type circuits can be used in a manner so that they are conditioned by the absence of the priority transmission to permit the secondary signal sources to have access to the transmission line.

Accordingly, a primary object of the present invention is to provide a system for permitting time sharing of a common communication channel or line by a multiplicity of data sources.

Another object of the present invention is to provide a relatively low cost multiplexing arrangement for allowing a low priority data source to have continuous access to a communication line except whenever a higher priority data record producing source requires access to the line.

A still further object of this invention is to provide a system for time sharing a common data communication path between at least two data sources wherein the lower priority source will be permitted continuous access to the common transmission path except during time periods that the higher priority source has data available for transmission.

The foregoing and other objects, features and advantages of the present invention will be apparent from the following more particular description of the preferred embodiment of the invention as is illustrated in the accompanying drawings.

DESCRIPTION OF PREFERRED EMBODIMENT

Figure 1:
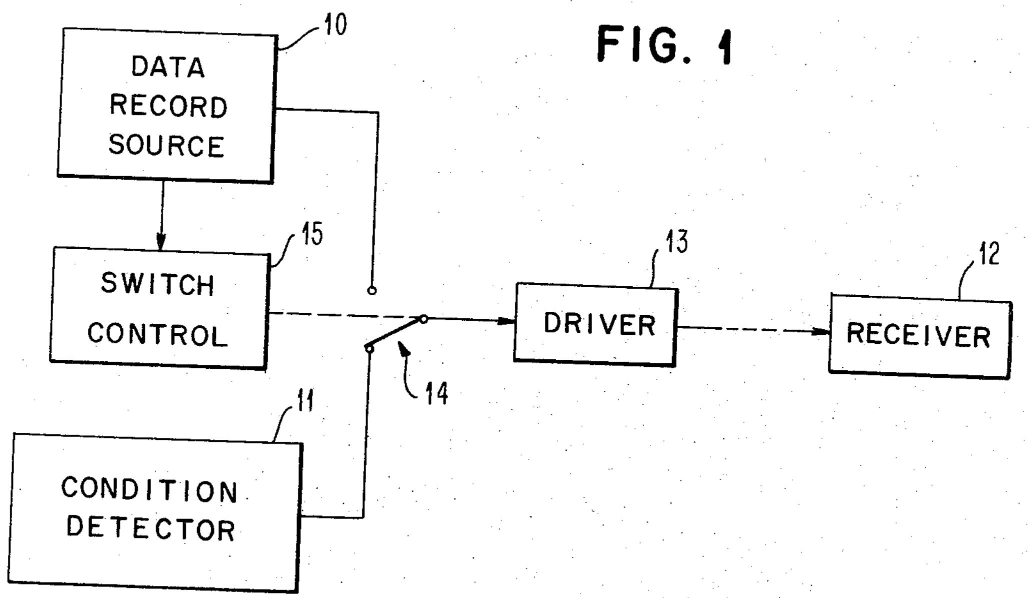
FIG. 1 shows a generalized block diagram of the major elements involved in the preferred embodiment of the present invention.

FIG. 1 illustrates an arrangement for permitting two data sources 10 and 11 to time share a common transmission path into a receiver unit 12 which could be a central processing unit or a computer system, a data channel or other data receiving apparatus. The signals are selectively fed through driver circuit 13 by appropriate setting of selector switch 14 under control of switch control circuit 15. It will be appreciated that a greater number of data sources of various kinds can be employed than the specific two shown.

Data record source 10 is presumed to be the higher priority data source which randomly produces blocks of data signals. For instance, the data record blocks produced by source 10 might be the sequence of pulses read from a badge reader. The initial appearance of an indication that a data record is ready for transmission from source 10 causes switch control circuit 15 to change switch 14 so that source 10 is connected to driver 13. Swich control 15 will maintain the switch in this condition until either a sufficient time has passed for the maximum length anticipated for any record block from source 10 or a signal is received from source 10 indicating that the record block has been transmitted.

Condition detector 11 can be one or more of a variety of relatively low priority events which are monitored. For instance, condition detection 11 might be an indication that the doorway associated with a badge reader which actuates source 10 has been opened or the lock thereof energized for unlocking purposes or the like. Condition detectors 11 are normally connected through switch 14 into driver 13 except during the particular time periods that source 10 requires this access. Receiver 12 can be the digital input interface of a data acquisition and control oriented data processing system. Such systems are capable of inspecting the time of occurrence between pulses from driver 13 and logically interpreting those pulses as representing a detected condition from detector 11 or the pulses of a discrete data record from source 10. Thus, no specific identification data need precede its transfer from either 10 or 11 to receiver 12.

Figure 2:
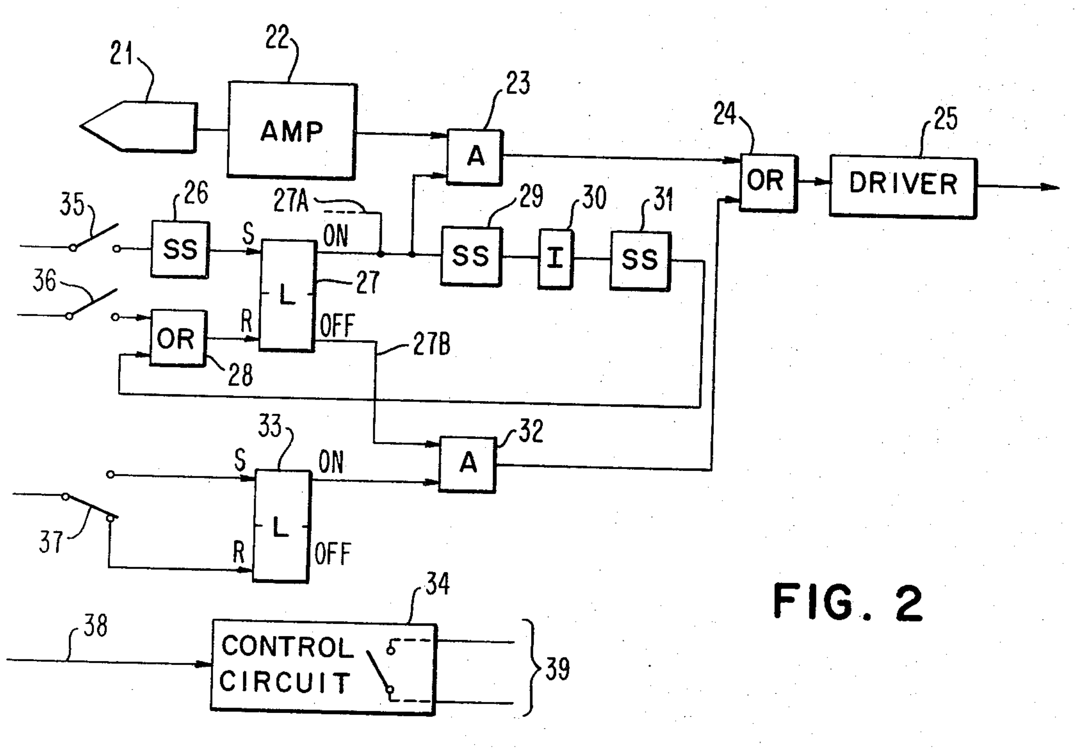
FIG. 2 shows a more detailed logic diagram of the circuit elements employed in the preferred embodiment of this invention.
Figure 4:
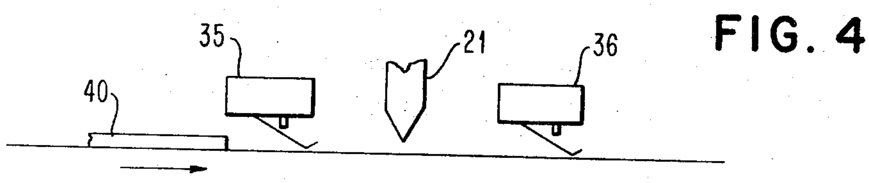
FIG. 4 illustrates a typical badge reader arrangement useful in the present invention.

The preferred embodiment will be described in terms of a system for allowing data from one or more status monitoring switches at a badge or credit card reader location to be transmitted over the same wire as the badge or credit card data. FIG. 2 illustrates a block diagram of such a badge or credit card reading system. FIG. 4 shows one potential means of implementing the badge reader wherein the badge or credit card 40 is inserted into the reader in the direction shown by the arrow so that a microswitch 35 is initially closed by the leading edge of badge 40.

Switch 35 is shown in FIG. 2 as being normally pen and, when closed by the leading edge of badge 40, fires single shot circuit 26 which in turn sets latch 27 on. Single shot 26 is included to prevent switch 35 from affecting latch 27 when a reset signal has appeared through OR 28. Switch 35 must be opened and then reclosed to turn latch 27 on repeatedly. This means badge 40 must be entirely withdrawn and subsequently reinserted to begin another read cycle. Although a discrete switch 35 has been shown, it will be understood that various other means can be used for signalling that a data record block is ready for transfer. For instance, a unique series of pulses could be sensed by a detector circuit (not shown) as they are read from the badge. In such an environment, a single shot and integrator can be used to block spurious responses to noise. In addition, the switch 36 function can be provided by detecting an end-of-record indication from badge 40. When latch 27 turns on, thus raising its "on" output 27A it brings up one leg of AND 23 thereby allowing signals detected as the badge or credit card 40 passes under read head 21 to be amplified by amplifier 22 and passed through OR 24 into driver 25. The output of driver 25 is coupled to the receiving system or device to which the FIG. 2 station is attached and might typically be the digital input interface of a data acquisition and control system. Latch 27 turning on also drops one leg of AND 32 since the "off" output 27B is then down thereby preventing the condition of latch 33 from reaching OR 24. In addition, latch 27 turning on fires single shot 29.

Latch 27 may be turned off in two different ways. If the leading edge of badge or credit card 40 reaches microswitch 36 before single shot 29 times out, then latch 27 will be reset through OR 28. The resetting or turning off of latch 27 drops one leg of AND 23 since output 27A is dropped thereby preventing signals detected when the badge or credit card is withdrawn from the reader from reaching the system or device to which the reader is attached. This prevents erroneous data from being transmitted as the badge or credit card 40 is being withdrawn. Single shot 29 timing out through inverter 30 will fire single shot 31 which in turn resets latch 27 through OR 28 provided that the badge or credit card 40 has not previously reached the second microswitch 36. The purpose of single shots 29 and 31 is to prevent an undesirable condition such as might arise if a badge is left in the reader or moved back and forth without being removed from the reader. That is, if a badge or credit card 40 is moved back and forth under read head 21 with switch 35 closed and switch 36 open, the firing of single shots 29 and 31 will prevent the signals thus detected from reaching the system or device to which the reader is attached through driver circuit 25 output connections. This prevents large amounts of useless and errouneous data from being transmitted and from the condition detector circuit from having access to driver 25. Thus single shot 29 produces a delayed output in response to an input thereto with a length of time sufficient to allow compelete reading of any badge or credit card 40 at some specified minimum speed. Single shot 26 insures that the badge or credit card 40 must be entirely withdrawn and reinserted to start another read cycle. The input from read head 21 and amplifier 22 can be caused by manual movement of a badge in a badge reader or by a mechanically actuated badge reader as desired.

Latch 33 is turned on or off depending on the position of a condition detecting switch 37. An example of the use of condition detecting switch 37 would be for door monitoring in the case of a reader used in a controlled access application. The condition switch 37 is mounted, for example, so that it will turn latch 33 on when the door is open and off when closed. When latch 27 is off so that output 27B is up indicating that a badge or credit card 40 is not being read, the status of latch 33 is available through AND 32 and OR 24 into driver 25 and thence to the receiving system or device to which the reader is attached. When latch 27 is on while a badge or credit card 40 is being read, the status of latch 33 is not available but instead data is transmitted through AND 23, OR 24 and driver 25 to the system or device to which the reader is attached. For the door switch example, badges may be read with the door open or closed with the ability to monitor door status when badges are not being read. In such environments, the typical operation generally does not entail both badge reading and door opening concurrently.

Control circuit 34 provides an example of a point which can be opened or closed by the receiving system or device to which the reader is attached. For example, in a controlled access application, control circuit 34 can operate a solenoid to allow the door to be opened after correct reading of the badge. It should be noted that switches 35 and 36 can be wired to be in a normally closed position and opened by the reading of a badge 40 to permit the use of latch 27 for reading the badge during withdrawal rather than insertion of the badge into the reader.

It should be noted that latch 33 can be used to store an indication of the condition occurrence until after the badge reading sequence has been completed at which time the stored indication can be transmitted if this should be desired. Such a modification would merely require a reset to latch 33 via an additional output from AND 32 with an appropriate delay so that an additional pulse would appear at the output of driver 25 following the record block from the badge reading operation. It should also be noted that record blocks could be transmitted from additional condition sensing other than the badge reader by monitoring the status of latch 27 and transmitting such blocks whenever latch 27 is in the reset condition. An array of condition detecting latches such as 33 can also be included with their outputs being ORed into AND 32.

Figure 3:
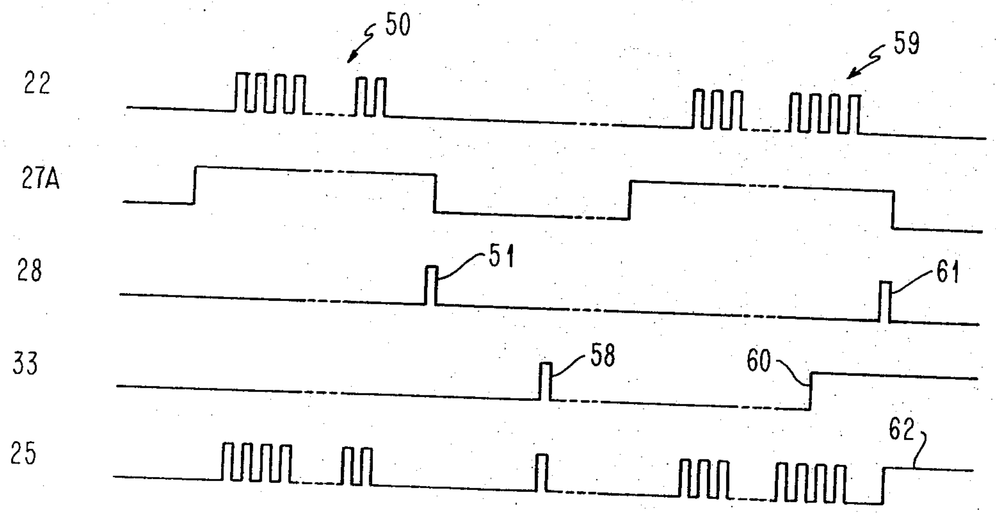
FIG. 3 is a time based diagram of some of the functions provided by FIG. 2 elements.

FIG. 3 shows a typical sample of the operation of the FIG. 2 circuitry on a time basis. The data record blocks obtained from the badge reader is shown generally at 50 as the output of amplifier 22. This data record typically includes a series of pulses having widely varying spaces therein but which continues for a preselected maximum period of time. For instance, it has been determined that a typical hand actuated badge reader wherein a magnetic stripe containing encoded digital data can have the complete record thereof read within a maximum time period of 1 second. Thus, a resetting output signal from OR 28 as shown at 51 will occur either when an end of record microswitch 36 is actuated or when a pulse from single shots 29 and 31 has been produced at a time period slightly greater than the 1 second maximum anticipated record length for block 50. In the FIG. 2 environment, the output from the condition detectors 33 will be available to the common communication channel driver 25 at all times that latch 27 is off. Note that the off output 27B for latch 27 is a mirror image of the on output 27A shown in FIG. 3. Thus, the occurrence of pulses 58 and 60 will be combined with the badge reading sequences 50 and 59 so as to produce the output shown for driver 25. The FIG. 2 arrangement would fail to detect the occurrence of any condition of latch 33 during record block 50 time but this can be tolerated if it is unlikely that there would be concurrence of such events or if the occurrence of the lower priority pulse from latch 33 is of no major consequence in the event that it is not detected. If latch 33 is monitoring a long term function like a door open/close condition, the occurrence of such a condition during reading of a block can be expected to persist long enough after the end of the block for detection. In FIG. 3, this is illustrated by event 60 occurring while block 59 is being read. Pulse 61 clears latch 27 so that event 60 thereafter raises driver 25 output as at 62. The receiving CPU recognizes 62 as a detected condition because of the length of time that driver 25 output remains up.

While the invention has been particularly described and shown relative to the foregoing embodiment, it will be understood by those having normal skill in the art that various changes and modifications other than those specifically mentioned may be made without departing from the spirit of this invention.

What is claimed is:

1. Apparatus for interleaving signals onto a common data path comprising first and second data sources, said first data source producing time spaced discrete groups of data, first coupling means for connecting said first data source to said common path, signal generating means for producing an output signal indicating that a group of data from said first data source is to be transferred to said common path, means responsive to said signal generating means output for producing a subsequent signal reflecting that an interval of time has passed which will permit transfer of the longest said data group to said common path, second coupling means for connecting said second data source to said common path, and switching means responsive to said signal generating means output for disabling said second coupling means and responsive to said subsequent signal producing means output for reenabling said second coupling means, whereby random data from said second source is continuously coupled to said common path except during said switching means operation.

2. Apparatus in accordance with claim 1 wherein said subsequent signal producing means includes a time-out circuit for providing an output indicative that a time interval has passed longer than the longest data group that can occur from said first data source, said apparatus further including means for producing an output reflecting that the transfer of a group of data is complete, said switching means being responsive to the first to occur of said time interval circuit output and said group transfer completion signals for reenabling said second coupling means.

3. Apparatus in accordance with claim 1 wherein said second coupling means includes means for storing an indication that data has been received from said second source until after said second coupling means has been reenabled by said switching means.

4. Apparatus for interleaving data onto a common data communication path comprising, a badge reader including a. a reading station for sensing data from a badge and for producing a data record block output in response thereto, b. a first switch for producing an initiating signal immediately prior to said reading station data record block output, latch means responsive to said first switch initiating signal for providing a set output, signal generating means operable subsequent to said first switch for producing an output signal after a sufficient length of time to accommodate the longest data record block from said reading station, said latch means producing a reset output in response to said signal generating means output signal, at least one source of data signals, and switching means for responding to said latch means set output for coupling said reading station data record block output to said common data path and for responding to said latch means reset output for coupling said source of data signals to said common data path, whereby said source of data signals will be coupled to the common data communication path except during time periods that data record blocks are being produced from said reading station during which periods said source of data signals is isolated from the common data communication path.

5. Apparatus in accordance with claim 4 wherein said signal generating means includes a second switch for sensing that a badge being read has passed said reading station so that the data record block to be read from said badge has been sensed by said reeading station and for producing an output indicative thereof.

6. Apparatus in accordance with claim 5 which further includes a timing circuit initiated in response to said first switch output for providing a signal after a time period has passed which is sufficiently long to accommodate a preselected time period for said reading station to have produced the longest acceptable data record block, and means for introducing a reset input to said latch means in response to both said second switch output and said timing circuit output.

* * * * *